(12) United States Patent
Harris et al.

(10) Patent No.: US 8,446,602 B2
(45) Date of Patent: May 21, 2013

(54) LOWERING THE CONSUMPTION OF INK IN COMPUTER PRINTING

(75) Inventors: Anthony William Harris, Donnington (GB); Peter Kaplan, Apex, NC (US); Bruno Bouby, Vancouver (CA); Jerry Lim, Delta (CA)

(73) Assignee: Spline Network Inc. (JP)

( * ) Notice: Subject to any disclaimer, the term of this patent is extended or adjusted under 35 U.S.C. 154(b) by 791 days.

(21) Appl. No.: 12/615,659

(22) Filed: Nov. 10, 2009

(65) Prior Publication Data

US 2010/0128287 A1 May 27, 2010

Related U.S. Application Data

(60) Continuation of application No. 12/000,050, filed on Dec. 7, 2007, now abandoned, which is a division of application No. 10/494,044, filed as application No. PCT/GB02/04591 on Oct. 9, 2002, now abandoned.

(30) Foreign Application Priority Data

Dec. 4, 2001 (GB) .................................. 0128981.8

(51) Int. Cl.
| | | |
|---|---|---|
| G06F 15/00 | (2006.01) | |
| G06F 3/12 | (2006.01) | |
| H04N 1/46 | (2006.01) | |
| B41J 29/38 | (2006.01) | |
| B41J 29/393 | (2006.01) | |
| B41J 2/205 | (2006.01) | |
| B41J 2/15 | (2006.01) | |
| B41J 2/21 | (2006.01) | |
| B41J 2/14 | (2006.01) | |

(52) U.S. Cl.
USPC ............. 358/1.13; 358/1.2; 358/1.3; 358/2.1; 358/1.14; 358/1.15; 347/5; 347/15; 347/19; 347/40; 347/41; 347/43; 347/47

(58) Field of Classification Search
None
See application file for complete search history.

(56) References Cited

U.S. PATENT DOCUMENTS 5,649,071 A 7/1997 Klassen et al.
5,712,930 A 1/1998 Watanabe
(Continued)

FOREIGN PATENT DOCUMENTS

EP 0580449 A1 1/1994
EP 0821320 A2 1/1998
(Continued)

OTHER PUBLICATIONS

U.S. Appl. No. 10/494,044, Non Final Office Action mailed Apr. 16, 2009, 11 pgs.

(Continued)

Primary Examiner — Benny Q Tieu
Assistant Examiner — Haris Sabah
(74) Attorney, Agent, or Firm — Schwegman Lundberg & Woessner, P.A.

(57) ABSTRACT

A method of printing an image comprises sending a data stream representing the image to a printer driver, generating a stream of print instructions at the printer driver, forwarding the stream of print instructions to a printer, and printing the image in accordance with the print instructions. The data stream or stream of print instructions is intercepted and processed so that the printer uses less ink to print the image than it would if the processing was not performed.

17 Claims, 7 Drawing Sheets

U.S. PATENT DOCUMENTS

| | | | |
|---|---|---|---|
| 5,751,434 | A | 5/1998 | Narendranath et al. |
| 5,841,951 | A | 11/1998 | Shu et al. |
| 6,007,182 | A | 12/1999 | Matsubara |
| 6,057,931 | A | 5/2000 | McConnell et al. |
| 6,081,340 | A | 6/2000 | Klassen |
| 6,166,751 | A | 12/2000 | Yamada |
| 6,233,061 | B1 | 5/2001 | Huang et al. |
| 6,283,569 | B1 * | 9/2001 | Otsuka et al. ............ 347/15 |
| 6,313,925 | B1 | 11/2001 | Decker et al. |
| 6,323,957 | B1 | 11/2001 | Ball |
| 6,390,590 | B1 | 5/2002 | Hansburg |
| 6,658,489 | B1 | 12/2003 | Asselin |
| 6,816,179 | B2 | 11/2004 | Hanyu |
| 7,167,260 | B2 | 1/2007 | Iwata et al. |
| 2001/0003457 | A1 * | 6/2001 | Doi ........................ 347/5 |
| 2002/0135800 | A1 | 9/2002 | Dutta et al. |
| 2003/0043231 | A1 | 3/2003 | Byers et al. |
| 2003/0053117 | A1 | 3/2003 | Payne et al. |
| 2005/0063749 | A1 | 3/2005 | Harris et al. |
| 2008/0175641 | A1 | 7/2008 | Harris |

FOREIGN PATENT DOCUMENTS

| | | | |
|---|---|---|---|
| EP | 0915414 | A2 | 5/1999 |
| EP | 1191434 | A1 | 3/2002 |
| FR | 2744061 | A1 | 8/1997 |
| GB | 2334124 | A | 8/1999 |
| JP | 1-259951 | A | 10/1989 |
| JP | 6-047927 | A | 2/1994 |
| JP | 7-148975 | A | 6/1995 |
| JP | 8-132642 | A | 5/1996 |
| JP | 8-275010 | A | 10/1996 |
| JP | 8-336961 | A | 12/1996 |
| JP | 9-095009 | A | 4/1997 |
| JP | 10-250119 | A | 9/1998 |
| JP | 11-010848 | A | 1/1999 |
| JP | 11-099670 | A | 4/1999 |
| JP | 11-129547 | A | 5/1999 |
| JP | 2001-150704 | A | 6/2001 |
| JP | 2001-219626 | A | 8/2001 |
| JP | 2001-318874 | A | 11/2001 |
| WO | WO-01/77809 | A1 | 10/2001 |

OTHER PUBLICATIONS

U.S. Appl. No. 12/000,050, Final Office Action mailed Sep. 16, 2010, 12 pgs.
U.S. Appl. No. 12/000,050, Response filed Jun. 8, 2009 to Restriction Requirement mailed Apr. 6, 2009, 9 pgs.
U.S. Appl. No. 12/000,050, Non-Final Office Action mailed Feb. 1, 2010, 12 pgs.
U.S. Appl. No. 12/000,050, Response filed Jul. 1, 2010 to Non Final Office Action mailed Feb. 1, 2010, 11 pgs.
U.S. Appl. No. 12/000,050, Response filed Nov. 19, 2009 to Restriction Requirement mailed Oct. 19, 2009, 8 pgs.
U.S. Appl. No. 12/000,050, Restriction Requirement mailed Apr. 6, 2009, 6 pgs.
U.S. Appl. No. 12/000,050, Restriction Requirement mailed Oct. 19, 2009, 6 pgs.
British Application Serial No. GB 0128981.8, Search Report dated Aug. 2, 2002, 2 pgs.
International Application Serial No. PCT/GB02/04591, International Search Report mailed Mar. 27, 2003, 5 pgs.
Patent abstract of FR 2744061, published Aug. 1, 1997, 1 pg.

* cited by examiner

My mistress' eyes are nothing like the sun;    100%

Coral is far more red than her lips' red;    90%

If snow be white, why then her breasts are dun;    80%

If hairs be wires, black wires grow on her head.    70%

I have seen roses damasked, red and white.    60%

But no such roses see I in her cheeks;    50%

And in some perfumes is there more delight    40%

Than in her breath that from my mistress reeks.    30%

*FIG. 6*

LOWERING THE CONSUMPTION OF INK IN COMPUTER PRINTING

PRIORITY CLAIM TO RELATED APPLICATIONS

This application is a continuation of U.S. application Ser. No. 12/000,050, filed on Dec. 7, 2007, which is a divisional of U.S. application Ser. No. 10/494,044, filed on Nov. 15, 2004, now abandoned, which is a national stage application of PCT Application No. PCT/GB02/04591, filed Oct. 9, 2002, and published on Jun. 12, 2003, as Publication No. 2003/049021, which claimed priority to United Kingdom Application No. 0128981.8, filed Dec. 4, 2001. These applications are incorporated herein by reference in their entirety.

The present invention relates to the reduction of ink printed on a page used by a printer.

As used herein, the term "ink" is intended to refer both to ink as used by ink jet printers, and to toner as used by laser printers. Thus the term "ink cartridge" as used herein may refers either to a replacement ink cartridge for an ink jet printer or a replacement toner cartridge for a laser printer.

A significant cost associated with owning a printer is that of replacing used ink cartridges. Indeed, as the price of printers decreases, but the price of ink cartridges does not, the cost of replacement cartridges can be comparable to the price of the original printer. Thus a user may be persuaded to buy a printer because it is cheap, but is then committed to frequent purchases of expensive ink cartridges.

Clearly one of the most effective ways to reduce the costs associated with buying replacement ink cartridges is to use less ink in the first place, so that cartridges last longer. The software drivers which are provided with printers and installed on the controlling computer generally offer a user the option of printing in "draft", "economy", or "high quality" mode, where draft and economy modes use less ink than high quality mode. However, draft mode typically yields such poor print quality that documents printed using this mode cannot be used for anything except proofing. Economy mode yields better output than draft mode, but typically still does not reach the quality required for most documents intended for circulation. In fact, the use of draft or economy modes frequently leads to the use of even more ink as the same document is printed twice, once in the low quality mode and then again in high quality mode.

Companies selling printers derive a significant proportion of their revenues from sales of consumables, and in particular ink and toner cartridges. As mentioned above, the printers themselves are often very cheap, but users are then committed to regular purchases of expensive ink cartridges. It is therefore not in the manufacturers' interest to minimise the amount of ink used, and settings such as "draft", "economy" etc. often do not do what the user expects in terms of ink utilisation. In practice, draft mode reduces ink usage by printing as few dots as possible to increase the printing speed. Economy settings typically apply a general masking function across the whole image to reduce the number of dots printed, but this compromises the quality of the output.

In accordance with a first aspect of the present invention, there is provided a method of printing an image, comprising:
sending a data stream representing the image to a printer driver;
generating a stream of print instructions at the printer driver;
forwarding the stream of print instructions to a printer; and
printing the image in accordance with the print instructions;
wherein the data stream or stream of print instructions is intercepted and processed so that the printer uses less ink to print the image than it would if the processing was not performed.

Thus the amount of ink used by the printer is reduced by a process separate from the printer driver's usual "draft", "economy" and "high quality" options. These options will still be available to the user, but a document printed using any of these options in a method according to the invention will consume less ink than if the data stream or print instructions had not been processed.

Ink jet and laser printers operate by printing a series of dots on the page to produce individual shapes. The document or image to be printed consists of a series of pixels which are fed to a software printer driver. The pixels are larger than the dots printed by the printer, and each pixel is made up of a series of dots when the document is printed. A colour printer will in general have three or more differently coloured inks available, the colour of each pixel being determined by the selection of dots used to print it. Furthermore, areas of the image having a uniform colour can use a selection of different coloured dots. For example, a magenta region would be printed on white paper by using a large number of magenta dots, whereas a lighter-coloured pink region would be printed by using a smaller number of the same magenta dots, leaving white spaces between. An orange region would be printed by using a mixture of magenta and yellow dots. This process is known as "half-toning"

To produce high resolution images or letters, a large number of pixels are used. If a lower resolution is used, there are fewer pixels, but each pixel is larger. In a typical "draft" mode, only a few pixels are printed (i.e. the pixels are printed at low resolution), but each pixel is small (i.e. the individual pixels are the same as those used at high resolution). In other words, many of the pixels are left out completely. The images or text consequently appear very "dull" on the page, with large amounts of white space.

Thus if the user wishes to use less ink, in the prior art system he would need to change the settings of the printer driver of the printer with which he intended to print the document. By changing these settings, for example by setting the printer driver so that the printer uses "draft" mode, the printer can be made to print fewer pixels.

In a preferred embodiment of the invention the reduction of the amount of ink used by the printer is achieved by processing the data stream or print instructions so as to result in a reduction of the number of dots printed by the printer. Ideally, the data stream or stream of print instructions is processed so that the dot reduction is performed in such a way that the visible quality of the document printed by the printer as perceived by a human viewer is not reduced. In one embodiment, dots are removed at random.

Preferably the step of processing the data stream or stream of print instructions comprises modifying black regions in the image to half-tone grey regions. This is preferably achieved by removing dots at random. It has been discovered that if a document comprising black objects such as text is printed at about 60% grey level, the human eye will not detect the difference between this and the same document printed using fully black pixels. Preferably the level of half-toning can beset by the user.

It has also been discovered that if the edges of filled objects such as text are sharply defined, the interior of such objects can be printed at a lighter shade without compromising the perceived quality of the document. Therefore in a preferred embodiment the step of processing the data stream or stream of print instructions includes modifying pixels in filled objects within the image to half-tone grey, but ensuring that pixels at the edge of filled objects remain highly saturated.

In order to reduce the use of coloured inks in a controlled manner, the step of processing the data stream or stream of print instructions preferably comprises mapping the pixels in the image from the work space of the data stream or stream of print instructions to the Hue, Luminance and Saturation (HLS) colour model, modifying the saturation or luminance of some or all of the pixels, and mapping the pixels in the image back to the work space of the data stream or stream of print instructions. In one embodiment, only the pixels which have had their saturation or luminance modified will be mapped back to the work space of the data stream or stream of print instructions. For the unchanged pixels, the pixels already specified in the original workspace of the data stream or stream of print instructions may be used. The step of modifying the saturation or luminance of a pixel may include replacing that pixel with a pixel having pre-stored HLS values.

Modifying saturation and luminance may include decreasing the saturation of at least some of the pixels, increasing the luminance of at least some of the pixels, or both.

Black ink is generally cheaper than coloured ink, but many printers print grey pixels by using a combination of their coloured inks. Preferably, therefore, the step of processing the data stream or stream of print instructions comprises modifying pixels so that the amount of black ink used to print those pixels is increased at the expense of coloured ink.

The step of processing the data stream or stream of print instructions may comprises identifying grey pixels in the image which will be printed using a combination of coloured inks, and modifying these pixels so that they will be printed using only black ink.

In one embodiment, the data stream is intercepted and processed before it reaches the printer driver. Preferably, the processing of the data stream does not depend on the printer driver to which the data stream is to be forwarded. In other words, the method operates independently of the printer and printer driver used. However, the processing of the data stream could be tailored to a particular printer, in which case the processing of the data stream is performed using information about the printer driver to which the data stream is to be forwarded. The processing of the data stream may be performed by a shell driver.

Thus the amount of ink used can thus be reduced whatever printer or printer driver is used. The shell driver reduces the amount of ink to be used without significantly affecting the print quality. Because the data stream is intercepted before it reaches the printer driver the invention has no effect on the way the printer driver operates: in other words, the printer can still be set for "draft", "normal" and "high quality" modes. The shell driver may reduce the amount if ink used by any of these modes by intelligent removal of dots.

In another embodiment, the stream of print instructions is intercepted and processed by an output filter after it has left the printer driver, but before it reaches the printer. Alternatively, the interception and processing of the data stream or print instructions may take place in the printer driver in a separate process from the generation of the stream of print instructions.

The shell driver or printer driver or output filter may have settings which can be varied so as to vary the degree of reduction of ink used by the printer. In other words, the amount of ink reduction can be set by the user. Preferably, once these settings have been determined by the user, the ink reduction will continue to apply every time a document is printed and will be "invisible" to the user. The settings of the shell driver, printer driver or output filter may therefore conveniently be controllable by the user at a system level, and more preferably by clicking on an icon in a Windows system tray.

Another useful function which can be performed by the shell driver is to predict how much ink will be used by the printer and inform the user accordingly. If the price of ink cartridges is known, the cost of the ink used by the printer to print a particular page could also be calculated. This allows the user to make an informed decision about whether he wishes to proceed with a particular print job in view of the predicted cost.

Many ink jet printers use three or more different colours of ink. The ink is often provided in sets of cartridges which cannot be replaced individually. Therefore, when one of the colours runs out, all of the cartridges have to be replaced. This leads to unnecessary waste with two of the cartridges being thrown away before they are finished. It also increases the cost to the user as he still pays for the unused ink.

In order to help the user at least partially overcome this problem, the shell driver, printer driver or output filter may also be arranged to keep a record of the predicted amount of ink used by the printer each time a document is printed, and to determine when the printer is likely to run out of one or more colours of ink. If the user is running out of one colour appreciably faster than the others, this gives him an opportunity to print documents using less of that colour to prolong the life of the cartridge. The step of processing the data stream or print instructions may also include modifying the colour balance of pixels so that the printer automatically uses less of the ink it is likely to run out of. The processing may also or alternatively include modifying the colour balance of pixels so that the printer uses different colour inks at approximately the same rate.

In accordance with a second aspect of the invention there is provided a method of reducing the ink used by a printer to print an image, the method comprising:
  intercepting a data stream, representing the image, sent to a printer driver for printing;
  processing the data stream so as to produce a modified data stream still representing the image;
  forwarding the processed data stream to the printer driver;
  generating a stream of print instructions;
  forwarding the stream of print instructions to the printer; and
  printing the image in accordance with the print instructions;
  wherein the step of processing the data stream results in a reduction of the amount of ink used by the printer as compared to the amount which would be used by the printer if the processing was not performed.

In accordance with a third aspect of the present invention there is provided a method of reducing the ink used by a printer to print an image, the method comprising:
  intercepting a stream of print instructions, representing the image, sent from a printer driver to a printer;
  processing the stream of print instructions so as to produce a modified stream of print instructions still representing the image; and
  printing the image in accordance with the modified print instructions;
  wherein the step of processing the stream of print instructions results in a reduction of the amount of ink used by the printer as compared to the amount which would be used by the printer if the processing was not performed.

The invention also provides a computer storage medium having stored thereon a program arranged to cause a computer to perform a method as described above.

In accordance with a fourth aspect of the present invention there is provided a system for printing documents from an application, comprising:

a printer driver arranged to receive a data stream corresponding to a document to be printed and forward instructions to a printer to print said document in response to the data stream; and a shell driver arranged either to intercept a data stream intended for the printer driver, process the data stream and pass the processed data stream to the printer driver, or to intercept a stream of print instructions intended for the printer, process the print instructions and pass the processed print instructions to the printer;

wherein the shell driver is arranged to process the data stream or print instructions in such a way that the printer uses less ink than it would if the data stream or print instructions was not processed.

Other aspects of the invention include installing an ink reduction driver on a computer, and causing a driver icon to be displayed in a system tray to enable settings of the ink reduction driver to be varied by the user.

Some preferred embodiments of the invention will now be described by way of example only and with reference to the accompanying drawings, in which:

FIG. 6 shows text printed with varying levels of half-tone grey;

Figure 1:
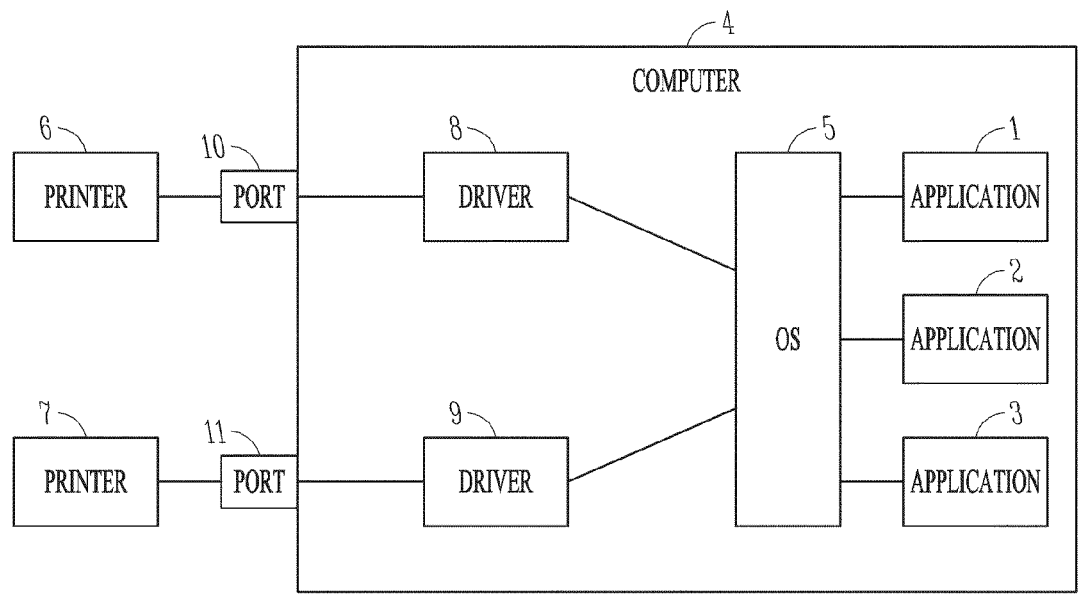
FIG. 1 is a schematic diagram of a standard system for printing documents from an application on a computer.

FIG. 1 shows a schematic diagram of a system for printing documents from applications 1, 2, 3 on a computer 4. The applications could be for example a word processor 1, an interne browser 2 and a drawing package 3. The applications run on top of an operating system 5. In this example the computer 4 is connected to two printers 6, 7. This might be the case, for example, if the computer is connected to a network (not shown) which includes more than one printer. It may also be that one of the printers 6 is a printer which can only be used to print black and white documents, and the other printer 7 is a colour ink jet printer which can be used to print documents which include colour.

Each printer 6, 7 has associated with it a printer driver 8, 9 installed on the computer 4 so as to run from the operating system 5. When a user wishes to print a document from an application, a printer is selected and a data stream, corresponding to the document to be printed, is sent from the application, via the operating system 5, to the printer driver corresponding to the selected printer. For example, if a document is to be printed from the word processor 1 by the black and white printer 6, a data stream is sent from the word processor 1 to the printer's driver 8. The printer driver 8 processes the data stream and converts it into instructions which will be understood by the printer 6. These instructions are forwarded, via an output port 10, such as a USB port or parallel port, to the printer 6. The printer 6 then prints the document.

Similarly, if a user wishes to print a colour picture from the drawing package 3, the colour ink jet printer 7 will be selected, and a data stream sent from the drawing package 3, via the operating system 5, to the colour printer driver 9, which processes the data stream and sends instructions, via an output port 11, to the colour printer 9. It will be appreciated that either printer 6, 7 can be used to print documents from any of the applications 1, 2, 3.

Each image to be printed consists of an array of pixels, each having Red, Green & Blue intensity values, which are fed to a software printer driver. The printer driver introduces a process known as half toning, whereby, for each colour (Red, Green or Blue), a pixel is represented by an array of same intensity dots. The number and arrangement of dots is determined by the intensity of that colour. The half tone data is passed to the printer for printing using the available inks.

Some printers and printer drivers use different colour work spaces for half toning. For example, systems using Cyan, Magenta and Yellow (CMY) are also frequently used, as are systems using Cyan, Magenta, Yellow and Black (CMYK), and systems using Cyan, Magenta, Yellow, Black, Light Cyan and Light Magenta (CMYKcm). The half toning for such systems works in the same way as for printers using Red, Green and Blue (RGB). It will be appreciated that if a data stream in RGB form is sent to the printer driver 9 of a printer 6 which has Cyan, Magenta, Yellow and Black inks, the printer driver will need to convert the data from RGB work space to CMYK work space before the half toning takes place.

Figure 2:
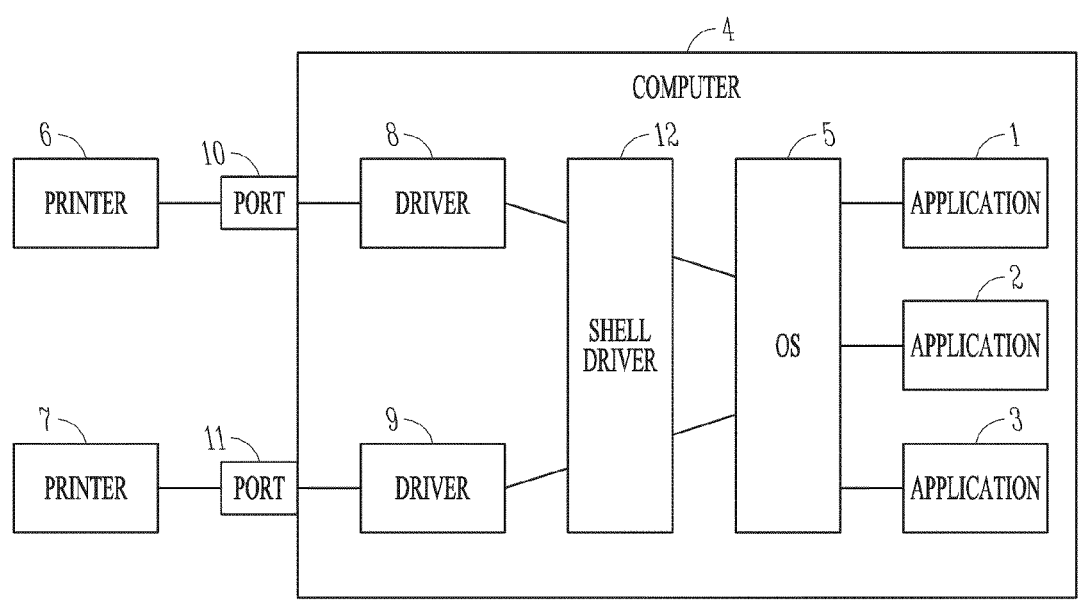
FIG. 2 is a schematic diagram of a system for printing documents including a shell driver providing ink reduction.

FIG. 2 shows the system of FIG. 1 to which has been added a shell driver 12. The shell driver is installed onto the computer 4 between the operating system 5 and the printer drivers 8, 9. The shell driver 10 is arranged so that it intercepts a data stream passed from the operating system 5 to any of the printer drivers 8, 9. When a data stream has been intercepted it is processed so that each region of the image to be printed will contain fewer dots when it has been half toned by the printer driver. The processed data stream is then passed to the printer driver already selected by the user.

Figure 3:
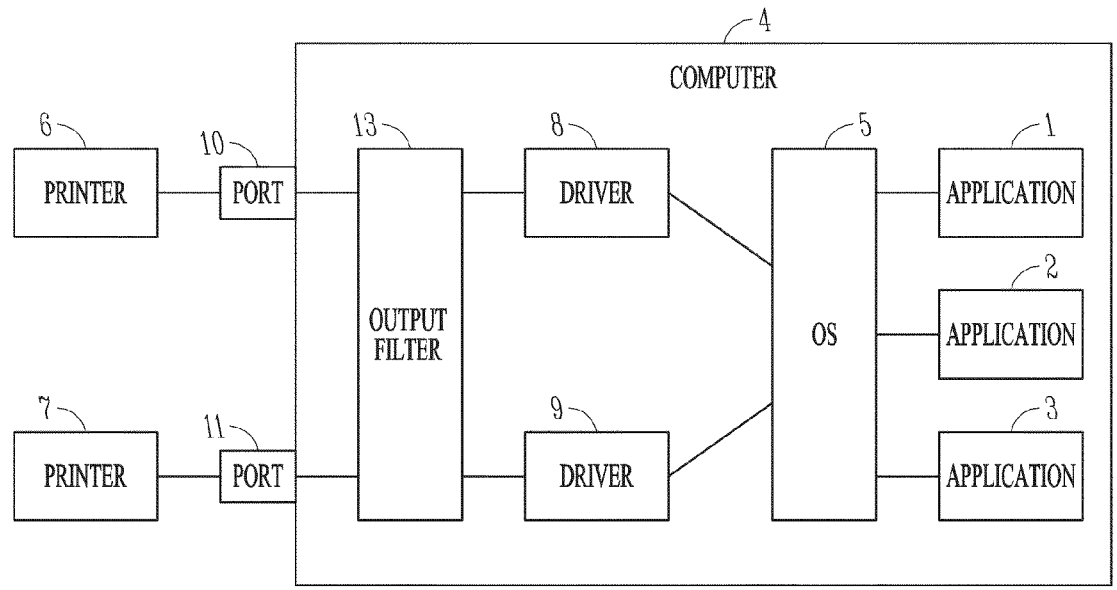
FIG. 3 is a schematic diagram of a system for printing documents including an output filter providing ink reduction.

FIG. 3 shows the system of FIG. 1 which has been modified according to an alternative embodiment of the invention. An output filter 13 is installed onto the computer and arranged so that it intercepts the printer instructions output by either of the printer drivers 8, 9 towards their corresponding printer 6, 7. The output filter 13 modifies these printer instructions so that each pixel of the image contains fewer dots. Since the half toning has already been performed by the printer driver, the printer instructions can be modified directly to remove dots. The modified printer instructions are then output towards the output port 10, 11 already selected by the printer driver so that they proceed to the printer 6, 7 selected by the user.

Figure 4:
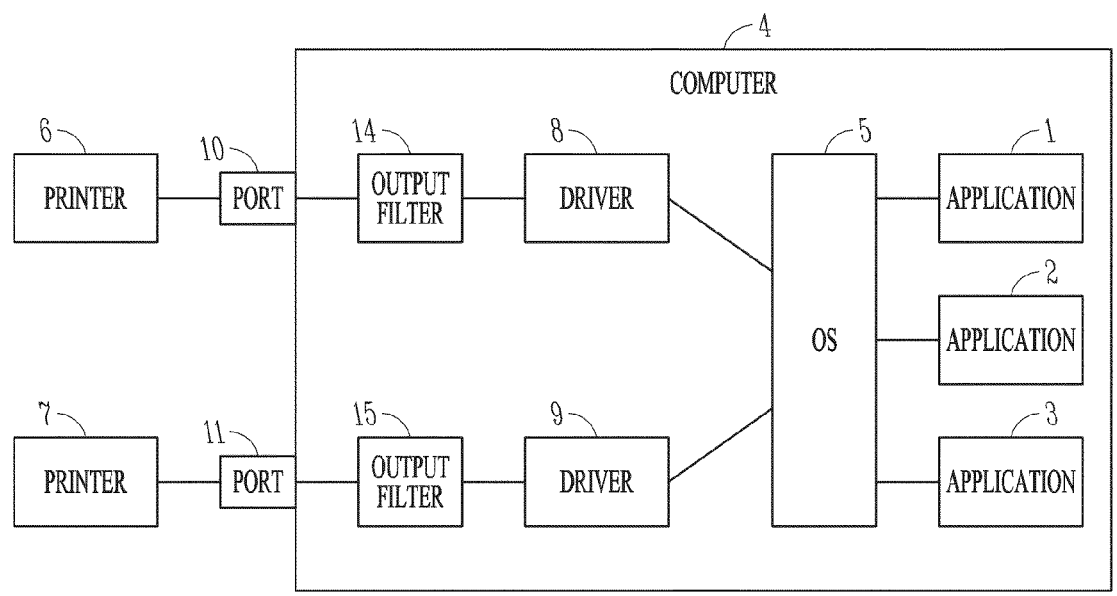
FIG. 4 is a schematic diagram of a system for printing documents including printer output filters.

FIG. 4 shows the system of FIG. 1 which has been modified by a yet further embodiment of the invention. Printer output filters 14, 15 are installed on the computer 4, each associated with an individual printer driver 8, 9, so as to intercept data between their associated printer driver 8, 9 and output port 10, 11. These operate in the same way as the output filter 13, by reducing the number of dots in each region of the image represented by the data stream issuing from their associated printer driver 8, 9. However, since each printer output filter 14, 15 is unique to a particular printer it is possible to tailor the dot reduction more precisely to the printer 6, 7 being used.

In another embodiment (not shown), no extra driver or filter is installed. However, the printer drivers 8, 9 are replaced with more sophisticated printer drivers which reduce the amount of ink used by the printers 6, 7 by reducing the number of dots printed.

The process of reducing the dots printed depends on the form of the printed document, and the process used for reduction of black ink is usually different to the process used for the reduction of coloured inks. The object is to reduce the amount of ink used without the user noticing a decrease in quality of the printed document. It will be appreciated that there may be a difference between the perceived quality—i.e. the quality as "seen" by a human reader, and a quantitatively measured quality.

Figure 5:
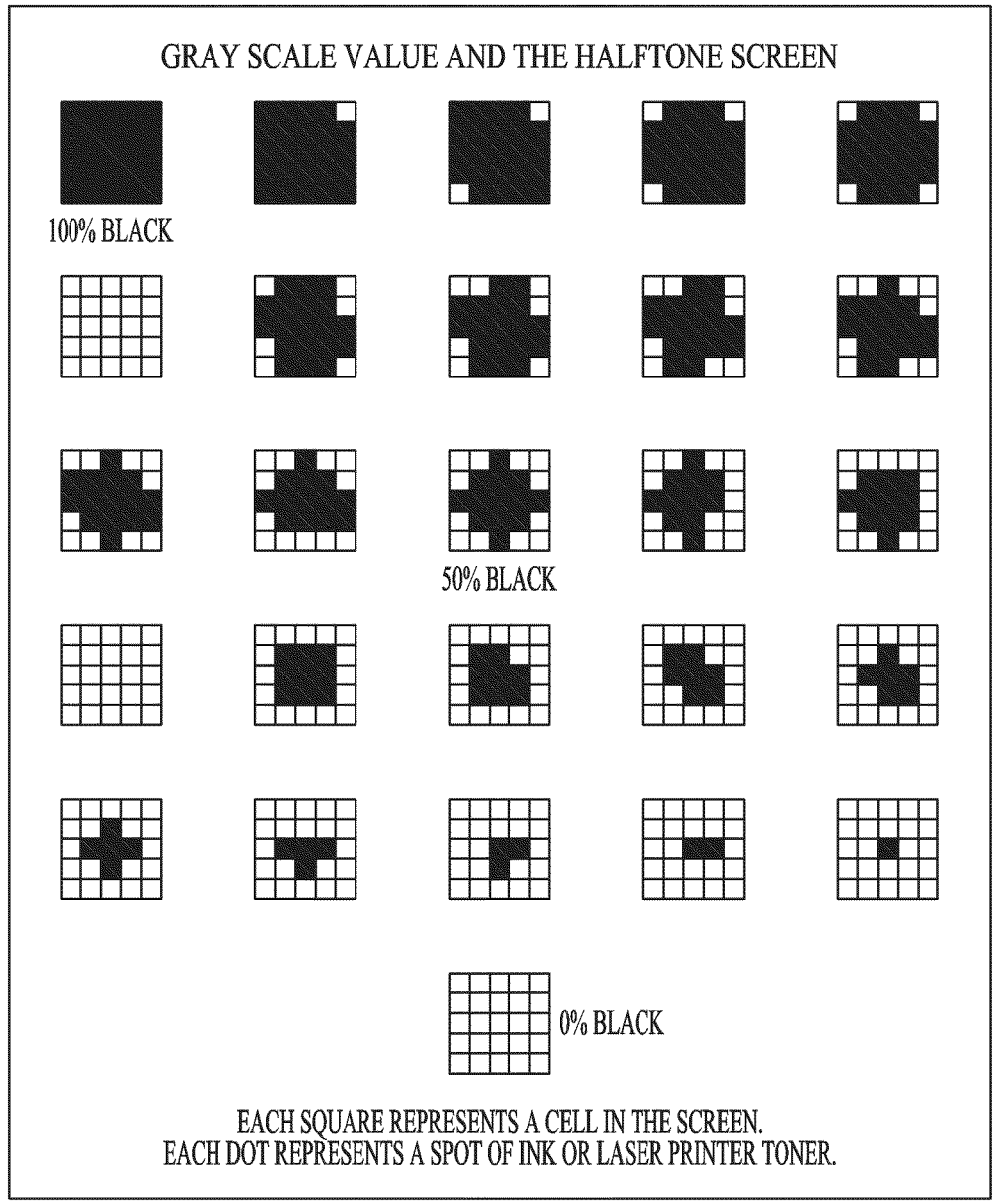
FIG. 5 shows a series of pixels with varying levels of half-tone grey.

The most common use of black ink is in text, vectors, and black fills in graphics and imagery. In many cases it is possible to reduce the amount of black ink used by substituting black for a grey colour. For a monotone printer the grey level is accomplished by half-toning. The printer simulates the grey level by printing a pattern of very small dots within a larger rectangle on the page, as shown in FIG. 5. Each rectangle represents a "half-tone cell". Each dot represents a spot of ink or laser printer toner. The number of dots that can be printed within the half-tone cell determines the number of grey values that can be simulated. The number of halftone cells determines the resolution of the image. This may also apply to colours other than black.

FIG. 6 shows a series of lines of text printed with percentages of black ink decreasing in steps of 10%, and illustrates that the average user will not perceive any noticeable degradation in the print quality unless it is lower than 60% grey value. Thus if "black" text (e.g. from a word processor) is printed at 60% grey value the ink saving will be 40%, but the user will not notice the difference. However, it may be that different users have different thresholds, and accordingly the user is able to select the amount of grey value at the expense of the perceived image quality. Different brand and model of printer may require different grey value settings.

In the example shown in FIG. 6, the dots removed to provide a particular grey value are the same for each half-tone cell. In another embodiment, dots are removed randomly from the half-tone cell. In other words, the same number of dots are removed from each half-tone cell, but from random positions within the half-tone cell. It has been found that this also improves the perceived quality of the final result.

The perceived quality can be improved still further by considering the edges of objects such as text fonts, black lines, or black filled objects such as rectangles, circles, ovals and closed polygon areas. A critical factor in the perceived "sharpness" of such objects is the density of dots around the edge of each letter. Therefore the shape of the object is outlined with a solid black, and the interior of the object is filled with the user selected grey level. This preserves the edge definition of the objects and maintains the high frequency spatial component of the image. The human eye is extremely sensitive to the edges of an image, since they carry high information content. The grey filled portion of the objects is the low frequency component of the image. The effect of half-toning the grey fill is essentially to insert noise to the low frequency component of the image. The human perception filters out the noise component since noise has a low information content. The amount of noise can be adjusted by the user when he selects the amount of grey level.

All of the above methods will work for documents printed using coloured inks. Using these methods. the dot removal would consist of reducing all of the coloured ink components (e.g. CYMK) for a given spatial position. The amount of ink removal can be adjusted by the user so that the resultant lightness in colour would not be obvious to the reader.

Figure 7:
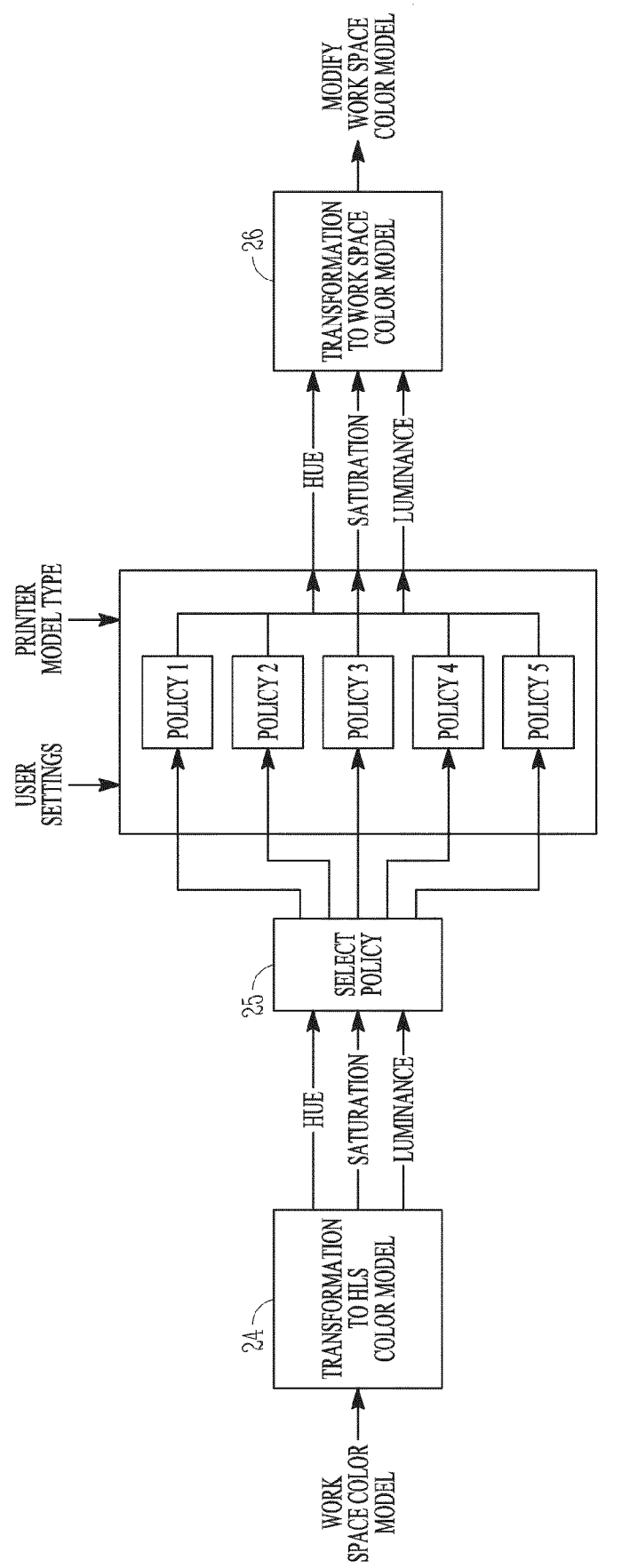
FIG. 7 is a data flow diagram for an ink reduction algorithm.

FIG. 7 is a data flow diagram for a colour ink reduction algorithm. The colour of a graphic or text object is input to the algorithm. The output of the algorithm is a modified colour, in the same work space (e.g. RGB, CMYK, CMYKcm etc) as the input colour, which uses less ink but which provides a colour close in perception to the original.

The algorithm has two external settings: User setting and Printer Model Type. The User setting allows the user to input the amount of ink saving versus the image quality of the print out. The Printer Model Type allows the selection of policies to be tailored to the individual printer models.

Different colour models can specify the colour of the graphic or text object. Examples of colour models include: RGB (Red, Green, Blue), CMY (Cyan, Magenta, Yellow), YIQ (Luminance, In-phase (Red-luminance), Quadrature (Blue-luminance)), HSV (Hue, Saturation, Value (Brightness)), and HLS (Hue, Luminance and Saturation). The Colour Ink Reduction algorithm will accept any colour specified in any colour model space and output the modified colour in that same colour model space.

Figure 8:
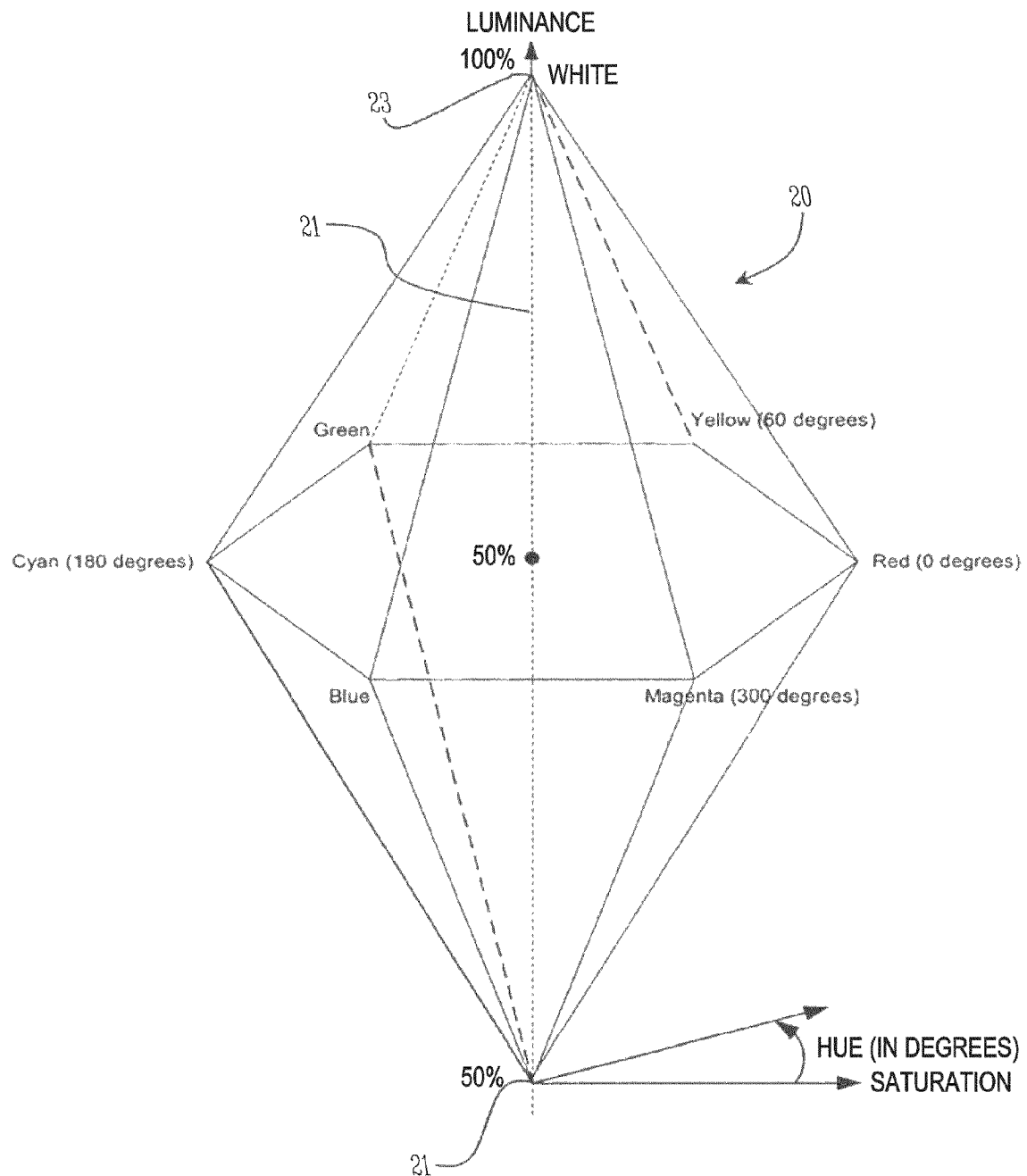
FIG. 8 is a diagram representing the encoding of colour in the HLS model.

The algorithm and algorithm policies are based on the HLS colour model. FIG. 8 shows how a colour is encoded using the HLS model. Hue is the "colour" of a pixel (red, yellow, green etc) and is represented as the angle around the vertical axis 21 of a double hexacone 20, with red at 0°. The colours occur around the perimeter in the same order they occur in the CIE diagram when its boundary is traversed anticlockwise: red, yellow, green, cyan, blue, and magenta. The CIE (Commission Internationale de l'Eclairage) XYZ model is a model defining three primary colours mingled in an additive manner called X, Y, Z that can be combined to match any colour humans see. This relates to the tristimulus theory of colour perception, which states that the human retina has three kinds of cones with peak sensitivity to 580 nm ("red"), 545 nm ("green") and 440 nm ("blue").

Luminance provides a measure of "lightness" and is represented by the vertical axis 21 of FIG. 8. The bottom 22 of the vertical axis represents 0% luminance (black) and the top 23 of the vertical axis represents 100% luminance (white). Saturation is a measure of the colour "intensity" and is represented by the radial distance from the vertical axis 21, from 0% on, the vertical axis to 100% on the surface of the hexacone.

Returning now to FIG. 7, the transformation 24 to the HLS model maps the colour specified in the Work Space Colour Model to the HLS Colour model. Based on the Hue, Saturation, and Luminance value of the input colour, the Select Policy block 25 then selects one of five policies. The policy selection will depend on the printer to be used. The selection of policies is defined once the printer has been characterised. Printer characterisation requires the printing of a large number of different colour samples (e.g. MacBeth Charts (standard images used to show the full gamut of visible image space reproduction for a device and a set of standard colours showing, among others, desaturated primaries and various skin tones)) and measuring the amount of ink usage for each colour sample.

The general policy heuristics are summarised below:
- The least objectionable mappings are those that preserve hue at the expense of luminance and saturation.
- For very small areas, hue can be changed slightly without noticeable colour perception
- Reducing the saturation decreases the amount of ink usage
- Increasing the luminance decreases the amount of ink usage and equalizes the usage of the three colour components (e.g. CYM).

The algorithm policy details are specified below:

Policy 1: Increase luminance by X1 and decrease saturation by Y1. After increasing the luminance by the amount of X1, and the total luminance is greater than 100%, then the luminance is clamped to 100%. After decreasing the saturation by the amount of Y1, and the total saturation is less than 0%, then the saturation is clamped to 0%. The user input specifies the amount of X1 and Y1 depending on the amount of ink saving versus print quality.

Policy 2: Increase luminance by X2. After increasing the luminance by the amount of X2, and the total luminance is greater than 100%, then the luminance is clamped to 100%. The user input specifies the amount of X2 depending on the amount of ink saving versus print quality.

Policy 3: Decrease saturation by Y2. After decreasing the saturation by the amount of Y2, and the total saturation is less than 0%, then the saturation is clamped to 0%. The user input specifies the amount of Y1 depending on the amount of ink saving versus print quality.

Policy 4: Use the original HLS value. This policy is chosen when there is no cost effective HLS value in the neighbourhood of the original HLS value. In other words, there is no change possible which is close in colour proximity and which consumes less ink. An example might be the colour white, which cannot be changed.

Policy 5: Use a prestored HLS value. This policy is chosen when there is no cost effective HLS value in the neighbourhood of the original HLS value.

Policy usage will depend on printer type. For printers that have a single colour cartridge dispensing CYM inks, policy 1 would be used to ensure that the colour from each reservoir is used at the same rate or as close to this as possible. For printers having individual colour cartridges for each colour, where it does not matter whether the colours are consumed at the same rate or not, policy 3 would be widely used.

The transformation 26 to work space colour model then maps the modified colour in HLS colour model back to the original work space colour model. It will be appreciated that only those pixels whose colours have been changed need be mapped back: the algorithm can remember the values of the unchanged pixels in the original work space. Alternatively all the pixels could be mapped from HLS back to the work space regardless of whether they have been altered or not.

Thus the number of dots printed can be reduced by increasing the luminance or decreasing the saturation of a pixel, without reducing the perceived quality.

A further improvement makes use of the fact that for colour inkjet printers, black or grey level is usually accomplished by using a combination of Cyan, Yellow, Magenta and Black (CMYK). This is not optimal in cost. Instead of using pure black ink and half-toning to achieve grey, the colour inkjet printers add Cyan, Magenta, and sometimes Yellow to achieve black or grey. However, these inks are more expensive than black so it is desirable to half-tone black or grey fill areas with black ink only.

Returning now to FIGS. 2, 3 and 4, once installation of the shell driver 12, output filter 13 or printer output filters 14, 15 has been completed, the user will continue to select printers and printer settings as before. He can still change the settings of the individual printer drivers 7, 8, but each setting will use less ink than without the interception of the shell driver, output filter, or printer output filter. This is particularly important for the "high quality" mode of printing. From the user's point of view, documents appear to be printed to the same standard, but less ink is used.

The shell driver 12, output filter 13 or printer output filters 14, 15 can be controlled by the user at a "system" level to vary the amount of ink reduction performed. The ink reduction can be turned on or off or varied simply (for example by changing the grey value used with reference to FIG. 6), and this will apply to all printers and printer drivers. Similarly any change to the level of ink reduction will apply to all printers and printer drivers. Control of the shell, output or printer output filter may be initiated by selection of a "system tray" icon, allowing the amount of ink reduction to be controlled from a Windows control panel.

Figure 9:
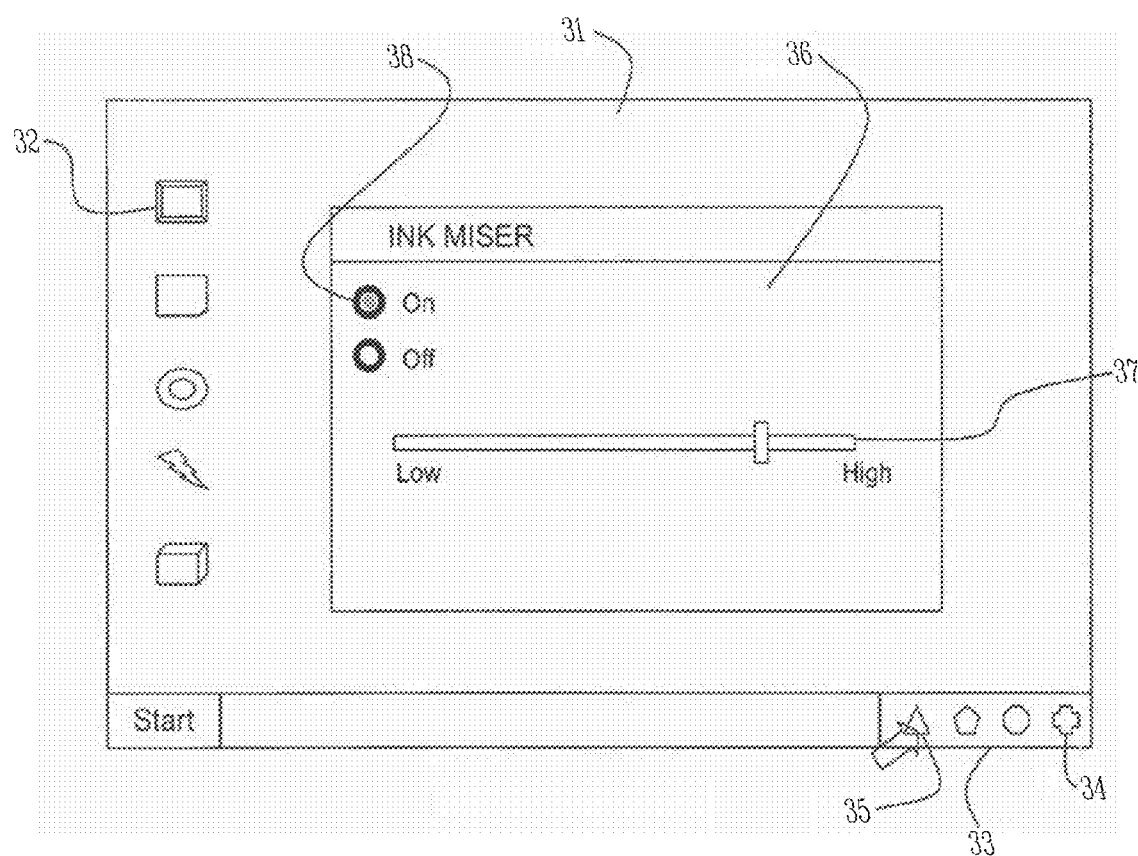
FIG. 9 shows a view of a windows desktop and control panel for controlling the settings of the shell driver of FIG. 2.

FIG. 9 shows an example of a Windows desktop 31. The desktop includes icons 32 which can be selected to run applications. The desktop also includes a system tray 33 containing icons 34 which can be selected in order to change the settings of drivers installed on the system. As shown in FIG. 9, an icon 35 corresponding to the ink reduction shell driver described above has been selected. This causes a control panel 36 to pop up. The control panel 36 includes buttons 38 to allow the shell driver to be switched on or off, so that the user has control over whether ink use is reduced when printing or not. The control panel also includes a sliding scale 37 which allows the user to control how much ink reduction is carried out by the shell driver.

The shell driver (or output filter, or printer output filter) may also predict the quantity of ink which will be used by a printer to print a document. Depending on the settings specified by the user, it can inform the user of how much ink will be used in printing that document (and how much it will cost) and offer the user the chance to cancel the print. It can also predict how much ink would have been used had dot reduction not been performed, and inform the user how much money has been saved by using less ink. This assumes a knowledge of ink cost and a detailed knowledge of printer properties.

A record of the predicted ink usage for each document printed may be kept by the shell driver. This enables it to inform the user when ink is likely to be running low. Furthermore, when a colour printer is used, the shell driver keeps separate records for the use of the different colours of ink. If one colour is being used substantially faster than the others, then the user is warned of this, allowing him to attempt to use less of that colour. For example, if the record of the ink used shows that red ink is running low, the driver suggests to the user that he tries to use less red in his documents. In a further embodiment, "ink balancing" may be carried out. In this case, the driver itself adjusts the amount of ink used by the printer so as to use less red.

It will be appreciated that departures from the above described embodiments will still fall within the scope of the invention. For example, the shell driver may be adapted to suit one particular type of printer or printer driver. It will still act independently of the printer driver, but the dot reduction will be tailored more specifically to that printer.

Furthermore, it will be appreciated that the interception of data before it reaches a printer driver need not be performed by a shell driver as such. Any driver or filter which processes the data before it reaches the printer driver is intended to fall within the scope of the invention.

What is claimed is:

1. A shell driver stored on a storage device, which when executed by at least one processor, cause the at least one processor to:
   intercept a data stream defining an image to be printed sent from an application to a printer driver before receipt by the printer driver;

process the intercepted data stream to generate a modified data stream which defines a modified image requiring less ink to be printed than the image defined by the intercepted data stream prior to processing;

forward the modified data stream to the printer driver; and wherein the shell driver is operable to process the intercepted data stream to generate the modified data stream defining the modified image which requires fewer dots of the ink to be printed by the printer than the intercepted data stream or to process the intercepted data stream to generate the modified data stream by modifying black regions in the image defined by the intercepted data stream to half-tone grey regions in the modified image.

2. The shell driver of claim 1, wherein the shell driver is operable to process the intercepted data stream to generate the modified data stream defining the modified image from which dots of ink have been removed at random compared with the image defined by the intercepted data stream.

3. The shell driver of claim 1, wherein the shell driver is operable to process the intercepted data stream to generate the modified data stream by modifying pixels in filled objects within the image defined by the intercepted data stream to half-tone grey, but ensuring that pixels at the edge of filled objects remain highly saturated.

4. The shell driver of claim 1, wherein the shell driver is operable to process the intercepted data stream to generate the modified data stream by:

mapping pixels in the image in a colour space defined by the intercepted data stream to a Hue, Luminance and Saturation (HLS) colour model;

modifying the saturation or luminance of some or all of the pixels; and mapping the modified pixels back to the colour space of the intercepted data stream.

5. The shell driver of claim 4, wherein the shell driver is operable to process the intercepted data stream to generate the modified data stream by decreasing the saturation of at least some of the pixels.

6. The shell driver of claim 4, wherein the shell driver is operable to process the intercepted data stream to generate the modified data stream by increasing the luminance of at least some of the pixels.

7. The shell driver of claim 1, wherein the shell driver is operable to process the intercepted data stream to generate the modified data stream by modifying pixels so that the amount of black ink used to print those pixels is increased at the expense of coloured ink.

8. The shell driver of claim 7, wherein the shell driver is operable to process the intercepted data stream to generate the modified data stream by:

identifying grey pixels in the image defined by the intercepted data stream which will be printed using a combination of coloured inks; and modifying these pixels so that they will be printed using only black ink.

9. The shell driver of claim 1, wherein the shell driver is further operable to predict how much ink will be used by the printer and display this information or the cost of the predicted ink.

10. The shell driver of claim 9, wherein the shell driver is further operable to keep a record of the predicted amount of ink used by the printer each time a document is printed, and determine when the printer is likely to run out of one or more colours of ink.

11. The shell driver of claim 10, wherein the shell driver is further operable to process the intercepted data stream to generate the modified data stream by modifying the colour balance of pixels so that the printer uses less of the ink it is likely to run out of.

12. The shell driver of claim 11 wherein the shell driver is operable to process the intercepted data stream to generate the modified data stream by modifying the colour balance of pixels includes modifying the colour balance towards the colour white.

13. The shell driver of claim 11, wherein the shell driver is operable to process the intercepted data stream to generate the modified data stream by modifying the colour balance of pixels so that the printer uses different colour inks at approximately the same rate.

14. A printing system:

at least one processor;

a printer driver executable on the at least one processor and operable to:

receive a data stream defining an image to be printed;

process the received data stream to generate a stream of print instructions for causing a printer to print the image defined by the received data stream; and forwarding a generated stream of the print instructions to the printer; and a shell driver executable on the at least one processor and operable to:

intercept the data stream defining the image to be printed sent to the printer driver before receipt by the printer driver;

process the intercepted data stream to generate a modified data stream which defines a modified image requiring fewer dots of ink to be printed than the image defined by the intercepted data stream prior to processing or to generate the modified data stream by modifying black regions in the image defined by the intercepted data stream to half-tone grey regions in the modified image; and forward the modified data stream to the printer driver.

15. The printing system of claim 14, further comprising a printer operable to receive a stream of print instructions from the printer driver and responsive to receipt of the stream of print instructions to print the image in accordance with the received stream of print instructions.

16. A printing method comprising:

providing a shell driver stored on a storage device and operable to intercept, using at least one processor a data stream defining an image to be printed sent by an application program to a printer driver and process, using the at least one processor, the data stream to generate a modified data stream which defines a modified image requiring less ink to be printed than the image defined by the intercepted data stream prior to processing;

sending the data stream defining the image to be printed from the application program to a printer driver;

intercepting the data stream before receipt by the printer driver using the shell driver;

processing the intercepted data stream using the shell driver to generate the modified data stream which defines the modified image requiring less ink to be printed than the image defined by the intercepted data stream prior to the processing;

forwarding the modified data stream to the printer driver;

processing the modified data stream using at the printer driver to generate a stream of print instructions for causing a printer to print the modified image;

forwarding the stream of print instructions to the printer;

printing the modified image in accordance with the print instructions; and wherein the reduction of an amount of ink used by the printer is achieved by the shell driver processing the intercepted data stream to generate the modified data stream defining the modified image which requires fewer dots of ink to be printed by the printer or processing the intercepted data stream to generate the modified data stream by modifying black regions in the image defined by the intercepted data stream to half-tone grey regions in the modified image.

17. The method of claim 16, wherein the reduction of dots of ink is achieved by the shell driver processing the intercepted data stream to generate the modified data stream defining the modified image from which dots of ink have been removed at random compared with the image defined by the intercepted data stream.

* * * * *

UNITED STATES PATENT AND TRADEMARK OFFICE
CERTIFICATE OF CORRECTION

PATENT NO. : 8,446,602 B2
APPLICATION NO. : 12/615659
DATED : May 21, 2013
INVENTOR(S) : Harris et al.

It is certified that error appears in the above-identified patent and that said Letters Patent is hereby corrected as shown below:

On the title page, item 56

In column 2, under "Other Publications", line 1, delete "U.S." and insert --"U.S.--, therefor In column 2, under "Other Publications", line 2, delete "2009," and insert --2009,",--, therefor On page 2, in column 2, under "Other Publications", line 1, delete "U.S." and insert --"U.S.--, therefor On page 2, in column 2, under "Other Publications", line 1, delete "2010," and insert --2010,",--, therefor On page 2, in column 2, under "Other Publications", line 3, delete "U.S." and insert --"U.S.--, therefor On page 2, in column 2, under "Other Publications", line 4, delete "2009," and insert --2009,",--, therefor On page 2, in column 2, under "Other Publications", line 5, delete "U.S." and insert --"U.S.--, therefor On page 2, in column 2, under "Other Publications", line 6, delete "2010," and insert --2010,",--, therefor On page 2, in column 2, under "Other Publications", line 7, delete "U.S." and insert --"U.S.--, therefor On page 2, in column 2, under "Other Publications", line 8, delete "2010," and insert --2010,",--, therefor Signed and Sealed this
Third Day of November, 2015

Michelle K. Lee
*Director of the United States Patent and Trademark Office*

On the title page, item 56

On page 2, in column 2, under "Other Publications", line 9, delete "U.S." and insert --"U.S.--, therefor On page 2, in column 2, under "Other Publications", line 10, delete "2009," and insert --2009,",--, therefor On page 2, in column 2, under "Other Publications", line 11, delete "U.S." and insert --"U.S.--, therefor On page 2, in column 2, under "Other Publications", line 12, delete "2009," and insert --2009,",--, therefor On page 2, in column 2, under "Other Publications", line 13, delete "U.S." and insert --"U.S.--, therefor On page 2, in column 2, under "Other Publications", line 14, delete "2009," and insert --2009,",--, therefor On page 2, in column 2, under "Other Publications", line 15, delete "British" and insert --"British--, therefor On page 2, in column 2, under "Other Publications", line 16, delete "2002," and insert --2002,",--, therefor On page 2, in column 2, under "Other Publications", line 17, delete "International" and insert --"International--, therefor On page 2, in column 2, under "Other Publications", line 18, delete "2003," and insert --2003,",--, therefor On page 2, in column 2, under "Other Publications", line 19, delete "Patent" and insert --"Patent--, therefor On page 2, in column 2, under "Other Publications", line 19, delete "1997" and insert --1997",--, therefor In the claims In column 11, line 33; in Claim 4, after "and", insert --¶--, therefor